United States Patent [19]

Cook

[11] Patent Number: 4,797,509
[45] Date of Patent: Jan. 10, 1989

[54] METHOD AND APPARATUS FOR CONNECTING ELECTRICAL CONDUCTORS TOGETHER

[75] Inventor: Jeffrey A. Cook, Sherwood, Oreg.

[73] Assignee: Nicor, Inc., Tualatin, Oreg.

[21] Appl. No.: 122,748

[22] Filed: Nov. 19, 1987

[51] Int. Cl.⁴ .................. H02G 15/08; H01R 43/04; H01R 4/20
[52] U.S. Cl. .................................. 174/84 C; 29/871; 156/49; 174/76; 174/DIG. 8
[58] Field of Search ............... 174/84 C, 76, DIG. 8; 156/49; 29/868, 869, 871; 403/265, 266, 267, 268, 285; 206/331, 334

[56] References Cited

U.S. PATENT DOCUMENTS

| | | | |
|---|---|---|---|
| 2,958,723 | 11/1960 | Logan et al. | 174/84 C |
| 3,359,361 | 12/1967 | Oakman | 174/76 |
| 4,142,592 | 3/1979 | Brusselmans | 174/92 |
| 4,151,364 | 4/1979 | Ellis | 174/84 C |
| 4,208,788 | 6/1980 | Siden | 29/871 X |
| 4,234,758 | 11/1980 | Guzy | 174/84 R |
| 4,273,953 | 6/1981 | Guzy | 174/84 R |
| 4,383,131 | 5/1983 | Clabburn | 174/73 R |
| 4,487,475 | 12/1984 | Ogawa | 156/158 X |
| 4,487,994 | 12/1984 | Bahder | 174/73 R |
| 4,544,231 | 10/1985 | Peterson | 350/96.2 X |
| 4,550,975 | 11/1985 | Levinson et al. | 350/96.18 |
| 4,696,841 | 9/1987 | Vidakovits | 174/DIG. 8 X |

FOREIGN PATENT DOCUMENTS 2059691  4/1981  United Kingdom .................. 174/76

Primary Examiner—Morris H. Nimmo
Attorney, Agent, or Firm—Klarquist, Sparkman, Campbell, Leigh & Whinston

[57] ABSTRACT

A connection system for electrical conductors is disclosed. The system involves an outer sheath manufactured from a material transparent to ultraviolet light. A tubular, deformable crimp ferrule is inserted within the sheath. Thereafter, a portion of ultraviolet-curable adhesive is placed within the ends of the sheath, which are covered with cap members to retain the adhesive inside. To connect the conductors (e.g. insulated wires or cables) the ends thereof are pushed through the cap members, through the ultraviolet-curable adhesive, and into the crimp ferrule. The crimp ferrule is then deformed to securely engage the ends of the conductors. Ultraviolet light is subsequently applied which passes through the sheath, causing the adhesive to solidify. The foregoing process produces a strong and secure bond between the conductors, and is readily adaptable to large-scale, mass production manufacturing conditions using a minimal amount of time and labor.

22 Claims, 1 Drawing Sheet

METHOD AND APPARATUS FOR CONNECTING ELECTRICAL CONDUCTORS TOGETHER

BACKGROUND OF THE INVENTION

The present invention generally relates to the connection of electrical conductors, and more particularly to a method and apparatus for securing electrical conductors together using a mechanical connection system in combination with chemical adhesives.

The development of sophisticated electronic instruments has created a need for electrical conductor connection systems of improved efficiency and reliability. Typical conductors used in these systems include insulated wires or cables, the ends of which must be physically joined to form a secure electrical connection. The reliability and strength of these connections are especially important in the aircraft industry, computer industry, and other specialized fields.

It is also important for the connection systems to be easily assembled under large-scale, mass production manufacturing conditions. Otherwise, increased production costs occur which result in higher costs to the purchaser of the assembled product.

A variety of electrical conductor connection systems have been developed and patented. For example, U.S. Pat. No. 4,151,364 to Ellis discloses a tubular connection member for electrical wires surrounded by a heat-shrinkable plastic tube having a thin interior layer of heat-activated adhesive.

U.S. Pat. Nos. 4,234,758 and 4,273,953 to Guzy disclose cable splicing systems in which a pair of cables are inserted within a metallic sleeve. The sleeve is deformed to frictionally engage and retain the cables. The sleeve and cables are then coated with an adhesive, and thereafter wrapped with insulating material, followed by a heat-shrinkable sleeve.

U.S. Pat. No. 4,487,994 to Bahder discloses a splicing system in which the ends of two cables are positioned within a tubular metal splicing member. Layers of semiconducting tape are wrapped around these components. The exterior of the assembled unit is encompassed within a heat-shrinkable tube, the ends of which include a sealant.

Other splicing systems incorporating comparable technology are disclosed in U.S. Pat. Nos. 4,383,131 to Clabburn and 4,142,592 to Brusselmans.

The present invention involves an improved connection system for electrical conductors using methods and materials substantially different from those previously known and used. The invention represents an advance in the art of connection technology in terms of economy, reliability, and applicability to large-scale, mass production manufacturing conditions.

SUMMARY OF THE INVENTION

It is an object of the present invention to provide a connection system for electrical conductors which produces a sealed connection of improved strength and durability.

It is another object of the invention to provide a connection system for electrical conductors which uses inexpensive, readily available materials.

It is a further object of the invention to provide a connection system for electrical conductors which uses a minimal number of process steps.

It is a further object of the invention to provide a connection system for electrical conductors which involves a minimal amount of production time.

It is a further object of the invention to provide a connection system for electrical conductors which is readily adaptable to large scale, mass-production manufacturing conditions.

It is a still further object of the invention to provide a connection system for electrical conductors which may be used with a variety of different conductors.

It is an even further object of the invention to provide a connection system for electrical conductors which produces a strong and secure connection resulting from the combined use of mechanical and chemical adhesion technologies.

To accomplish these objectives, a connection system for electrical conductors is provided which involves a unique combination of methods and materials. Typical conductors to be joined using the invention include wires or cables having an external insulation layer, and an underlying core of conductive material. The components used to connect the conductors include a tubular sheath manufactured of a material allowing the passage of ultraviolet light therethrough. An open-ended crimp ferrule sized to receive the end of each conductor is inserted within the sheath. Thereafter, a portion of ultraviolet-curable adhesive is injected into the ends of the sheath, which are subsequently sealed with cap members. When connection of the conductive members is desired, the ends thereof are pushed through the cap members, through the adhesive, and into the interior of the crimp ferrule. Next, the crimp ferrule is physically deformed to securely engage the ends of the conductors. Ultraviolet light is then applied which passes through the sheath causing the adhesive to polymerize and solidify. The foregoing process is usable to connect a variety of different conductors together. It produces a strong and secure bond between the conductors, and is readily adaptable to large-scale, mass production manufacturing conditions using a minimal amount of labor. In addition, it dramatically reduces the production time needed in comparison with previously used methods.

These and other objects, features, and advantages of the invention will be described in the following drawings and detailed description of a preferred embodiment.

DETAILED DESCRIPTION OF A PREFERRED EMBODIMENT

The present invention involves a method and apparatus for connecting two or more electrical conductors together in a fast, efficient and secure manner. The term "electrical conductors" as used herein shall encompass any physical assembly or components conventionally used to carry electricity. However, the invention is especially suited to the use of wire or cable materials comprised of conductive metal surrounded by insulating material (e.g. plastic or rubber).

Figure 1:
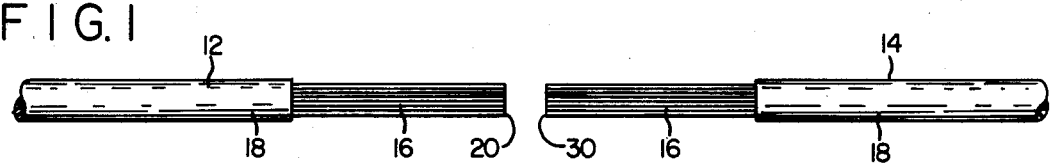
FIG. 1 is a side view of two conductors to be connected in accordance with the present invention.

With reference to FIGS. 1-5 the assembly of a conductor connection manufactured according to the present invention is illustrated. As shown in FIG. 1, elongate conductors 12, 14 are provided which each consist of a wire having an underlying metal conductive portion 16 surrounded by an insulating layer 18. The insulating layer 18 at end 20 of the conductor 12 is removed to expose the underlying conductive portion 16. Likewise, the insulating layer 18 at end 30 of the conductor 14 is removed to expose the underlying conductive portion 16. The ends 20, 30 of the conductors 12, 14 will be subsequently secured together using the steps described herein.

Figure 2:
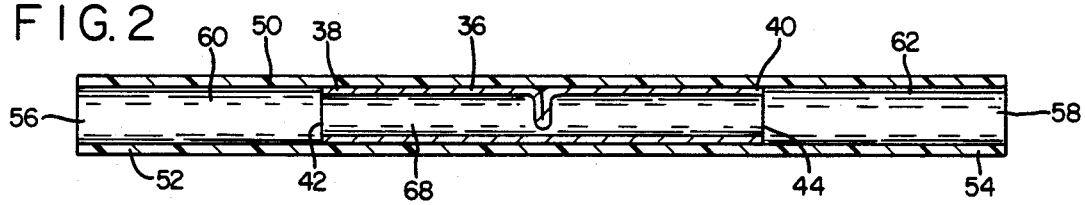
FIGS. 2–6 are sequential cross sectional views of the components used to connect the conductors of FIG. 1 in accordance with the invention.

FIGS. 2-6 show the components used to produce a connection between the ends 20, 30 of the conductors 12, 14. As illustrated in FIG. 2, a connecting member or crimp ferrule 36 is first provided which is tubular in configuration and manufactured of a suitable conductive metal. Preferred metals used to manufacture the crimp ferrule 36 include aluminum, stainless steel, beryllium-copper alloys, nickel-copper alloys, and other metals conventionally used in the electronics industry. The crimp ferrule 36 is readily deformable, and includes ends 38, 40 having openings 42, 44 sized to receive the conductive portions 16 of the ends 20, 30.

The crimp ferrule 36 is inserted within a tubular sheath 50 (FIG. 2). The sheath 50 includes ends 52, 54 having openings 56, 58. It has a diameter greater than that of the crimp ferrule 36, and is also longer than the crimp ferrule 36.

The sheath 50 is manufactured of an ultraviolet-transparent material which, as used herein, shall mean any material allowing the transmission of ultraviolet light therethrough with minimal absorption. Preferred materials used to manufacture the sheath 50 include polyethylene terephthalate plastic sold by the DuPont Company under the name Mylar, ® polyvinylidene fluoride plastic sold by the Pennwalt Company under the name Kynar, ® and other materials including polyethylene, polypropylene and nylon.

The sheath 50 may optionally be made of a material which, when exposed to heat, will shrink in size. Heat shrinkable materials are conventionally, manufactured by taking materials such as Mylar ® or Kynar, ® and expanding them under high temperature/pressure conditions. The expanded product is then cooled in an expanded state. Heat-shrinkable materials usable to form the sheath 50 (including heat shrinkable Mylar ®) are available from the Remtek Company of Fremont, Calif. If heat-shrinkable material is used, heat should be applied to the sheath 50 immediately after insertion of the crimp ferrule 36. The heat should only be applied to those portions of the sheath 50 surrounding the crimp ferrule 36. The ends 52, 54 of the sheath 50 should not be heat-treated so that they will remain open.

Once the crimp ferrule 36 is inserted within the sheath 50, a zone 60 is created between the end 52 of the sheath 50 and the end 38 of the crimp ferrule 36, as illustrated in FIG. 2. Likewise, a zone 62 is created between the end 54 of the sheath 50 and the end 40 of the crimp ferrule 36.

Figure 3:
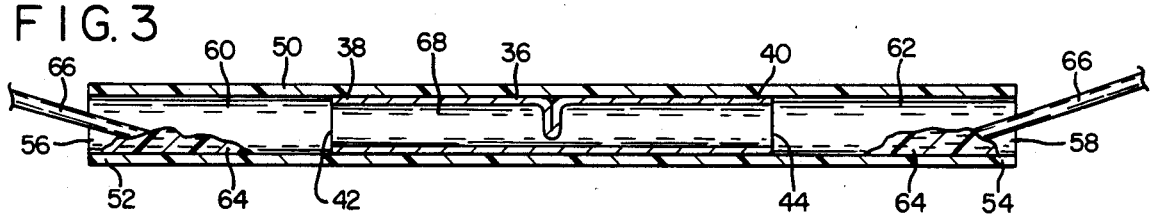

Next, a liquid adhesive 64 is placed within zones 60, 62 of the sheath 50 using a conventional injection system 66 (FIG. 3). The adhesive 64 must be of a type which quickly cures and solidifies upon the application of ultraviolet light. Materials suitable for this purpose include those manufactured by the UVEXS Company of Mountain View, Calif. under the following composition codes: 605-A (modified methacrylated/acrylated urethane), 606-A (modified methacrylated/acrylated urethane), and 506-H (acrylated urethane). The adhesive 64 fills the zones 60, 62 and may also enter the interior 68 of the crimp ferrule 36.

Thereafter, the openings 56, 58 in the ends 52, 54 of the sheath 50 are each capped using a suitable cap member 70 which retains the adhesive 64 within the sheath 50. The cap members 70 are preferably manufactured of paper, wax, or plastic.

Figure 4:
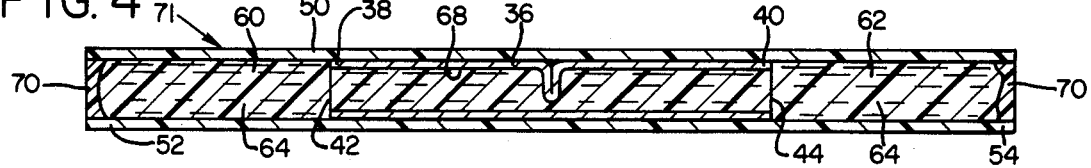

The resulting product consists of a sealed connection member 71 shown in FIG. 4 usable to connect the conductors 12, 14 when desired. When stored in the absence of light, the connection member 71 has a six month shelf life.

Figure 5:
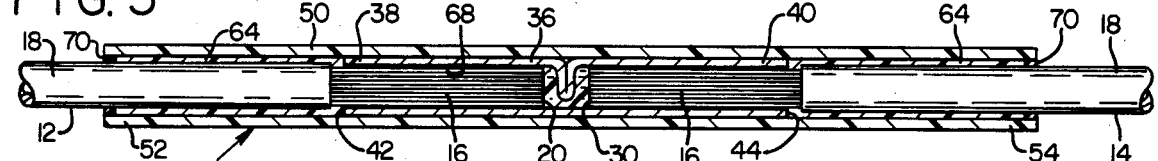

To connect the conductors 12, 14 together, the end 20 of conductor 12 is inserted into and through the cap member 70 in end 52 of the sheath 50 (FIG. 5). Likewise, the end 30 of the conductor 14 is inserted through the cap member 70 in end 54 of the sheath 50. This process may be done one conductor at a time, but for the purposes of this example, conductors 12, 14 are inserted into the sheath 50 simultaneously.

Once inside the sheath 50, the ends 20, 30 of the conductors 12, 14 are urged inward so that the metal conductive portions 16 of each end 20, 30 are positioned within the interior 68 of the crimp ferrule 36.

Figure 6:
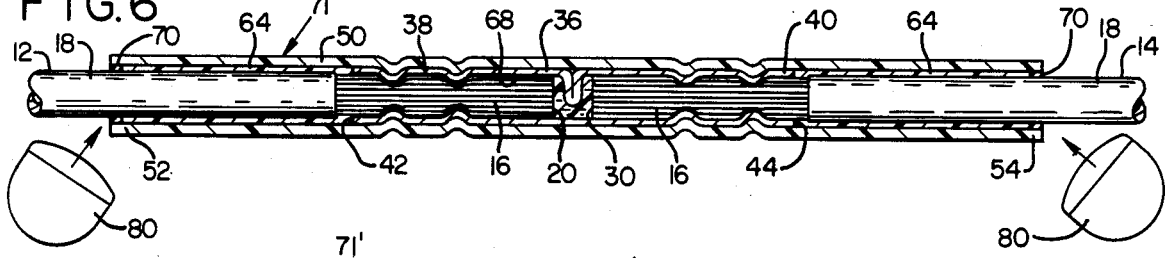

Next, force is applied to the crimp ferrule 36 which is deformed so that the conductive portions 16 of the ends 20, 30 are securely retained within the crimp ferrule 36 (FIG. 6). Care must be taken to insure that deformation of the crimp ferrule 36 does not cause penetration of the sheath 50.

Having completed this step, the ultraviolet curable adhesive 64 is cured using an external source 80 of ultraviolet light which passes through the ultraviolet transparent sheath 50 into the adhesive 64 (FIG. 6). Curing the adhesives described herein typically involves the application of 2-5 seconds of ultraviolet radiation. This may be accomplished using a 200 watt per inch mercury lamp with a minimum intensity of 150 milliwatts per square centimeter at 365 nanometers. In addition, a commercial ultraviolet radiation system which may be used is manufactured by the UVEXS Corporation under the designation "SCU 100." This system uses an optical wand 5 mm in diameter and delivers ultraviolet light from a 100 watt mercury vapor short arc lamp. After treatment with ultraviolet light, the adhesive 64 cures and solidifies within the sheath 50.

It should also be noted an optional primer composition may be used in conjunction with the adhesive 64 in applications where the conductors 12, 14 are coated with an especially smooth, bond-resistant layer of insulation. The primer is applied to the interior of the sheath 50 prior to application of the adhesive 64. Typical primers usable for this purpose include isopropanol-based materials available from UVEXS Corporation.

The resulting connection between the conductors 12, 14 is strong, secure, and moisture-impervious. The processing time used to produce the connection is substantially less than that required by other types of chemical or mechanical connecting systems. Likewise, the foregoing procedure is especially well suited to large scale, mass production manufacturing conditions where the deforming and ultraviolet curing steps may be combined to produce an extremely rapid assembly process. Thus, the invention represents a substantial departure in electrical conductor connection technology in terms of economy and production time.

Figure 7:
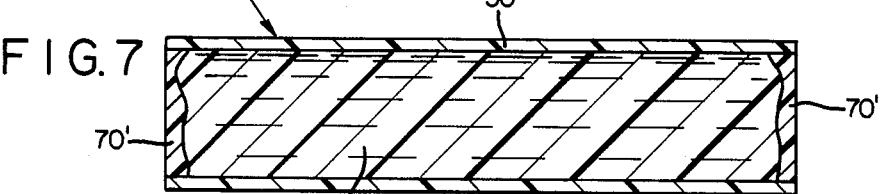
FIG. 7 is a cross sectional view of an alternative form of connection unit used to connect the conductors of FIG. 1 in accordance with the invention.
Figure 8:
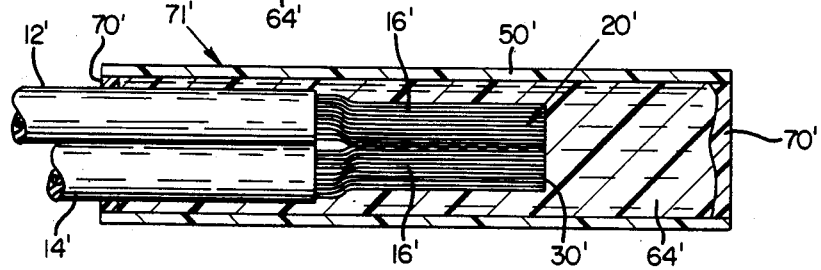
FIG. 8 is a view partially in cross section showing the connection unit of FIG. 7 as used to connect the conductors of FIG. 1 together in accordance with the invention.

An alternative form of the invention is shown in FIGS. 7 and 8. This form uses the same materials as those in the embodiment of FIGS. 2–6, except for the absence of the crimp ferrule 36.

First, a sheath 50' is filled with ultraviolet-curable adhesive 64', and sealed with cap members 70' to form a connection member 71' illustrated in FIG. 7. If desired, the sheath 50' may be manufactured with one end permanently sealed so that only one cap member 70' is required (at the other end). The connection member 71' may then be set aside until needed. To secure the conductors 12', 14' together, they are first placed in a parallel relationship as shown in FIG. 8. In this orientation, the conductive portions 16' of the ends 20', 30' are adjacent each other and secured together by soldering or the like. The secured ends 20', 30' are then pushed through one of the cap members 70' through the adhesive 64' and into the interior of the sheath 50'. Ultraviolet light is then applied which passes through the sheath 50', causing solidification of the adhesive 64' to produce the final product illustrated in FIG. 8.

Having herein described preferred embodiments of the present invention, it is anticipated that other forms may be used by those skilled in the art and still come within the scope of the invention. For example, more than one conductor may be inserted within each end of the connection members formed according to the invention, and secured together as described above. Likewise, in the embodiments described herein, use of the cap members may be omitted in circumstances where the immediate securing together of the conductors is desired. All of the procedural steps used in the invention would otherwise be the same. Therefore, the present invention shall only be construed in accordance with the following claims.

What is claimed is:

1. An apparatus for connecting a plurality of electrical conductors together, the ends of which comprise an exposed portion of electrically conductive material, said apparatus comprising:
    a deformable connecting member comprised of electrically conductive material, said connecting member having ends sized to receive said ends of said conductors, the deformation of said connecting member causing said ends of said conductors to be secured therein:
    a sheath comprised of a material allowing the passage of ultraviolet light therethrough, said sheath having ends sized to receive said conductors and a diameter greater than that of said connecting member, said connecting member being positioned within said sheath:
    a portion of ultraviolet-curable adhesive within each end of said sheath, said adhesive, when cured, causing said conductors and connecting member to be secured within said sheath; and
    sealing means at each end of said sheath for retaining said adhesive therein until the connection of said conductors is desired.

2. The apparatus of claim 1 wherein said sheath is comprised of heat-shrinkable plastic.

3. The apparatus of claim 1 wherein said connecting member is shorter in length than said sheath.

4. The apparatus of claim 1 wherein said sealing means comprises a cap member secured to each end of said sheath.

5. The apparatus of claim 4 wherein each cap member is manufactured of a material selected from the group consisting of paper, wax and plastic.

6. An apparatus for connecting a plurality of electrical conductors together, the ends of which comprise an exposed portion of electrically conductive material, said apparatus comprising:
    a deformable connecting member comprised of electrically conductive material, said connecting member having ends sized to receive said ends of said conductors, the deformation of said connecting member causing said ends of said conductors to be secured therein:
    a sheath comprised of a heat-shrinkable plastic material allowing the passage of ultraviolet light therethrough, said sheath having ends sized to receive said conductors, a diameter greater than that of said connecting member, and a length greater than that of said connecting member, said connecting member being positioned within said sheath;
    a portion of ultraviolet-curable adhesive within each end of said sheath, said adhesive, when cured, causing said conductors and connecting member to be secured within said sheath; and
    a cap member secured to each end of said sheath for retaining said adhesive therein until the connection of said conductors is desired.

7. An electrical connection comprising:
    at least two electrical conductors each having an internal portion of electrically conductive material surrounded by an external layer of insulation material, the ends of said conductors having said insulation material removed to expose said conductive material;
    a connecting member comprised of electrically conductive material having said ends of said conductors therein, said connecting member being deformed so as to securely engage said ends of said conductors;
    a sheath surrounding said connecting member comprised of a material allowing the passage of ultraviolet light therethrough, said sheath having ends sized to receive said conductors, a diameter greater than that of said connecting member and a length greater than that of said connecting member; and
    a portion of ultraviolet-cured adhesive within each end of said sheath, said adhesive causing said conductors and connecting member to be secured therein.

8. The electrical connection of claim 7 wherein said sheath is comprised of heat-shrinkable plastic.

9. A method for connecting a plurality of electrical conductors together, the ends of which comprise an exposed portion of electrically conductive material, said method comprising:
    placing a deformable connecting member comprised of electrically conductive material within a sheath comprised of a material allowing the passage of ultraviolet light therethrough, said sheath having ends sized to receive said conductors, a diameter greater than that of said connecting member, and a length greater than that of said connecting member;
    inserting a portion of ultraviolet-curable adhesive within each end of said sheath; and sealing each end of said sheath so as to retain said adhesive therein until the connection of said conductors is desired.

10. The method of claim 9 wherein said sheath is comprised of heat-shrinkable plastic.

11. The method of claim 10 further comprising the step of applying heat to said sheath in the regions thereof surrounding said connecting member so as to shrink said sheath around said connecting member without shrinking said ends of said sheath.

12. The method of claim 9 wherein said sealing of each end of said sheath is accomplished by securing a cap member thereto.

13. The method of claim 9 further comprising the steps of:
inserting at least one of said ends of at least one of said conductors through each of said sealed ends of said sheath when the connection of said conductors is desired;
urging said ends of said conductors through said adhesive and into said connecting member;
compressing and deforming said connecting member to secure said ends of said conductors therein; and
applying ultraviolet light through said sheath in an amount sufficient to cause said adhesive therein to cure and solidify so as to retain said conductors and connecting member within said sheath.

14. A method for connecting a plurality of electrical conductors together, the ends of which comprise an exposed portion of electrically conductive material, said method comprising:
placing a deformable connecting member comprised of electrically conductive material within a sheath comprised of a material allowing the passage of ultraviolet light therethrough, said sheath having ends sized to receive said conductors, a diameter greater than that of said connecting member, and a length greater than that of said connecting member;
inserting a portion of ultraviolet-curable adhesive within each end of said sheath;
securing a cap member to each end of said sheath so as to retain said adhesive therein, said cap members being retained in position until the connection of said conductors is desired;
inserting at least one of said ends of at least one of said conductors through each of said cap members of said sheath when the connection of said conductors is desired;
urging said ends of said conductors through said adhesive and into said connecting member;
compressing and deforming said connecting member to secure said ends of said conductors therein; and
applying ultraviolet light through said sheath in an amount sufficient to cause said adhesive therein to cure and solidify so as to retain said conductors and connecting member within said sheath.

15. The method of claim 14 wherein said sheath is comprised of heat-shrinkable plastic.

16. A method for connecting a plurality of electrical conductors together, the ends of which comprise an exposed portion of electrically conductive material, said method comprising:
placing a deformable connecting member comprised of electrically conductive material within a sheath comprised of a material allowing the passage of ultraviolet light therethrough, said sheath having ends sized to receive said conductors, a diameter greater than that of said connecting member, and a length greater than that of said connecting member;
inserting a portion of ultraviolet-curable adhesive within each end of said sheath;
inserting at least one of said ends of at least one of said conductors into each end of said sheath;
urging said ends of said conductors through said adhesive and into said connecting member;
compressing and deforming said connecting member to secure said ends of said conductors therein; and
applying ultraviolet light through said sheath in an amount sufficient to cause said adhesive therein to cure and solidify so as to retain said conductors and connecting member within said sheath.

17. The method of claim 16 wherein said sheath is comprised of heat-shrinkable plastic.

18. An apparatus for connecting a plurality of electrical conductors together, the ends of which comprise an exposed portion of electrically conductive material, said apparatus comprising:
a sheath comprised of a material allowing the passage of ultraviolet light therethrough, said sheath having at least one end sized to receive said conductors;
a portion of ultraviolet-curable adhesive within said sheath, said adhesive, when cured, causing said conductors to be secured within said sheath; and
a cap member secured to said end of said sheath for retaining said adhesive therein until the connection of said conductors is desired.

19. An electrical connection comprising:
at least two electrical conductors each having an internal portion of electrically conductive material surrounded by an external layer of insulation material, the ends of said conductors having said insulation material removed to expose said conductive material, said conductors being parallel to and adjacent each other, with said ends thereof being secured together;
a sheath surrounding said secured ends of said conductors comprised of a material allowing the passage of ultraviolet light therethrough; and
a portion of ultraviolet-cured adhesive within said sheath, said adhesive causing said conductors to be secured therein.

20. A method for connecting a plurality of electrical conductors together, the ends of which comprise an exposed portion of electrically conductive material, said method comprising:
providing a sheath comprised of a material allowing the passage of ultraviolet light therethrough, said sheath having at least one end sized to receive said conductors;
inserting a portion of ultraviolet-curable adhesive within said sheath;
sealing said end of said sheath so as to retain said adhesive therein until the insertion of said conductors therein is desired;
orienting said conductors so that said conductors are parallel to and adjacent each other, with said ends thereof contacting each other;
securing said ends of said conductors together;
inserting said secured ends of said conductors through said sealed end of said sheath and into the interior thereof through said adhesive; and
applying ultraviolet light through said sheath in an amount sufficient to cause said adhesive therein to cure and solidify so as to retain said conductors within said sheath.

21. The method of claim 20 wherein said sealing of said end of said sheath is accomplished by securing a cap member thereto.

22. The method of claim 20 wherein said ends of said conductors are soldered together.

* * * * *